US006854487B2

(12) United States Patent
Witemyre et al.

(10) Patent No.: US 6,854,487 B2
(45) Date of Patent: Feb. 15, 2005

(54) FLUID CONDUIT WALL INHIBITING HEAT TRANSFER AND METHOD FOR MAKING

(75) Inventors: James Jay Witemyre, Erlanger, KY (US); Jeffrey Glover, Cinicnnati, OH (US); Robert J. Meek, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/607,456

(22) Filed: Jun. 26, 2003

(65) Prior Publication Data

US 2004/0261875 A1 Dec. 30, 2004

(51) Int. Cl.[7] .................................................. F16L 9/14

(52) U.S. Cl. ...................... 138/114; 138/148; 138/145; 138/146; 428/432

(58) Field of Search ................................ 138/114, 112, 138/113, 145, 146, 148; 428/432

(56) References Cited

U.S. PATENT DOCUMENTS 3,607,388 A 9/1971 Hori et al. .................... 427/74
4,381,333 A 4/1983 Beggs et al. ............. 428/312.6
4,399,199 A 8/1983 McGill et al. .............. 428/633
4,524,718 A * 6/1985 Gordon ...................... 118/718
4,663,557 A 5/1987 Martin et al. ............... 313/112
5,270,092 A * 12/1993 Griffith et al. ................ 428/69
5,296,285 A 3/1994 Babel et al. ................ 428/213
5,503,874 A 4/1996 Ackerman et al. .......... 427/237
5,523,132 A * 6/1996 Zhang et al. ............. 428/34.4
5,627,426 A 5/1997 Whitman et al. ........... 313/116
5,658,614 A 8/1997 Basta et al. ................. 427/253
5,693,368 A 12/1997 Ackerman et al. .......... 427/253
5,723,937 A 3/1998 Whitman et al. ........... 313/116
5,851,679 A 12/1998 Stowell et al. ............. 428/472
6,207,299 B1 * 3/2001 Krauth et al. ............... 428/653
6,315,497 B1 * 11/2001 Wittman et al. ............ 405/158

* cited by examiner

*Primary Examiner*—Patrick Brinson
(74) *Attorney, Agent, or Firm*—William Scott Andes; Lee H. Sachs

(57) ABSTRACT

A fluid conduit wall enclosing a hollow interior for the flow of fluid includes an outer surface provided with a low emissivity coating having a coating emissivity of less than 0.2 and a thickness at least sufficient to provide the coating emissivity. One embodiment provides a fluid conduit with multiple spaced-apart walls. An outer surface of an inner wall of a first member and an inner surface of an outer wall of a second member define a gap therebetween. At least one of such surfaces includes the low emissivity coating. A method for providing such coating deposits the coating, for example by reactive vaporization, concurrently on both surfaces from within the gap after assembly of the members.

20 Claims, 2 Drawing Sheets

37 15 10 12 26 30 18 28 20 16 22 35 32 33 34 31 14

FLUID CONDUIT WALL INHIBITING HEAT TRANSFER AND METHOD FOR MAKING

BACKGROUND OF THE INVENTION

This invention relates to a conduit for the flow of a fluid and, more particularly, to a conduit including a low emissivity coating disposed to inhibit heat transfer through a wall of the conduit.

Power generating apparatus, for example an aircraft gas turbine engine, as well as various well-known flight vehicles, can be subject during operation to conditions producing undesirable atmospheric icing on components. For example, such icing can occur at and/or within such areas as an engine inlet or engine nacelle, as well as at various external surfaces of the vehicle. To reduce or eliminate such icing conditions, various anti-ice systems have been included in such apparatus.

In one form, a heated fluid, for example heated air from a turbine engine, is passed through a complex conduit, such as relatively long, spaced-apart double wall tubing including bends about other components, from a heat source to an area adjacent a potential icing site. For more efficient engine operation and use of such heated air, it is desirable to retain the heat in the air within the conduit during passage of the air from the heat source to the potential icing site. In addition, an outer surface of a heated anti-ice conduit potentially can be subject to contact with flammable fluids, one example of which is hydraulic fluid, leaking from another component and having an auto-ignition temperature lower than the temperature of the outer surface of the heated conduit. In that example, should a failure occur in a system adjacent the conduit, flammable fluid contacting an outer surface of an anti-ice conduit at a temperature at or above such auto-ignition temperature can result in a fire within the apparatus.

One current arrangement to reduce such flammable fluid ignition potential as well as to retain heat within the conduit is to dispose an insulating material about the conduit outer walls and associated supports. However, such insulation is relatively heavy, adding to the total engine weight. This reduces engine efficiency to the extent engine power is required to lift and carry such insulation. In addition, such insulation requires additional assembly time, is relatively expensive, reduces clearances, and is susceptible to field damage.

Various metallic and non-metallic coatings have been reported for use on external surfaces of components either for enhancing absorption of heat energy or for reflecting such energy from a surface. One type for thermal control surfaces of spacecraft is described in such U.S. Pat. No. 3,607,338—Webb and U.S. Pat. No. 5,296,285—Babel et al. Other types relate to hot operating components of turbine engines to reflect heat from an external surface of an article. One typical example is U.S. Pat. No. 5,851,679—Stowell et al. in which a multi-layer coating is provided on a substrate exposed to combustion gases.

Provision of a conduit wall with a coating that is very thin, light weight and effectively can inhibit heat transfer through the conduit wall can increase apparatus operating efficiency. In addition such a coating that can be provided on the conduit wall prior to assembly in an apparatus can reduce apparatus assembly time and thereby reduce the cost of the apparatus.

BRIEF SUMMARY OF THE INVENTION

The present invention, in one embodiment, provides a fluid conduit enclosing a hollow interior for the flow of fluid therein. The fluid conduit comprises a conduit wall of a metal alloy and a single layer metallic coating on a wall outer surface. The conduit wall includes a wall inner surface exposed to the fluid and a wall outer surface having a wall emissivity of at least about 0.4 prior to use. The single layer metallic coating on the wall outer surface is a low emissivity metallic coating having a coating emissivity of less than 0.2 and a coating thickness at least sufficient to provide the coating emissivity and a thickness of no greater than 5000 angstroms.

Another form of the present invention provides a method for making such a fluid conduit comprising spaced-apart double walls enclosing the hollow interior for the flow of fluid therein. The double wall structure comprises an outer wall having an inner surface and an inner wall having an outer surface. The method comprises assembling a pair of coaxial hollow conduit members disposed with a smaller inner member within and spaced-apart from a larger outer member. An inner surface of the wall of the outer member is maintained in a spaced-apart position from an outer surface of the wall of the inner member to define a gap therebetween. Then the low emissivity coating is deposited on the assembled conduit from within the gap concurrently on the inner surface of the outer member wall and the outer surface of the inner member wall. In one embodiment, the assembled double walled fluid conduit is shaped with bends, prior to depositing the coating, for subsequent assembly about associated apparatus.

DETAILED DESCRIPTION OF THE INVENTION

Figure 1:
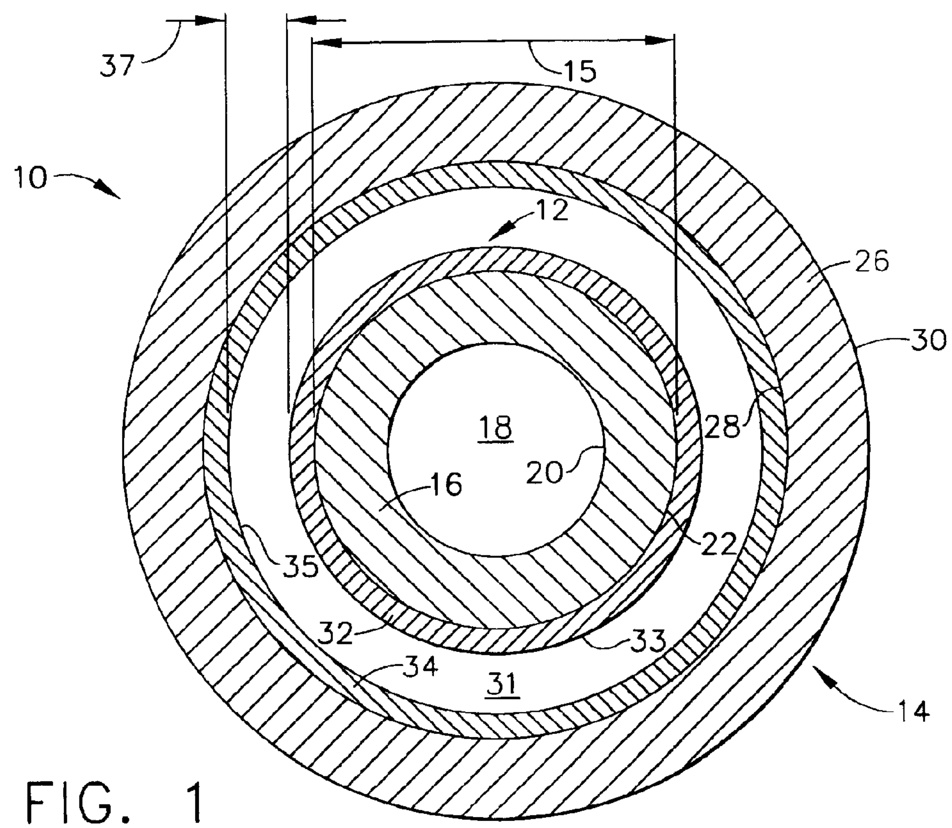
FIG. 1 is a diagrammatic sectional view of one embodiment according to the present invention of a fluid conduit including spaced-apart double walls each having a wall surface defining a gap therebetween, the wall surfaces each including a thin, low emissivity coating.

Some current commercial forms of aircraft gas turbine engines sometimes are referred to as bypass turbofan engines or, more simply, fan engines. As is widely described in the art, such an engine includes a turbojet as a core of the engine and a duct enclosing a multi-blade fan radially outwardly of and surrounding the core. During engine operation, air is directed to flow through the core as well as through the outer duct. Radially outward of the fan is an engine nacelle that can enclose flammable fluid carrying apparatus as well as long, hollow, appropriately shaped metallic anti-ice conduit or tubing.

Typically, for safety in containment of heated anti-ice air in aircraft turbine engine applications, such a conduit has been constructed as a shaped, spaced-apart double wall structure with ambient, static air in a gap between inner and outer conduit members. In longer conduits comprising relatively long conduits segments, spacers maintain the members in the spaced-apart relationship. For ease of assembly about other components, a long conduit is provided in shaped segments that are joined during assembly, typically at cooperating flanges. During engine operation, heated air, for example from the engine compressor at a temperature in the range of about 800–1200° F., flows through the long, complex shaped conduit hollow interior from the engine to selected engine or nacelle surfaces. Heated fluid in the anti-ice conduit heats such surfaces to avoid detrimental ice formation that can occur under certain low temperature operating conditions.

In gas turbine engine applications, the walls of the conduit typically are made of a metal having a wall surface emissivity of at least about 0.4 before use and up to about 0.8 or more after operation use as a result of surface oxidation. To conserve heat within such a long, complex shaped conduit and to inhibit emission of heat from the conduit outer surface, it has been a practice to dispose thermal insulation about the conduit and associated hardware after assembly within the engine structure. As discussed above, lifting and carrying the added weight of such insulation during aircraft engine operation is at the expense of engine efficiency. In addition, in the event of a flammable fluid system leak in the vicinity of the anti-ice conduit, flammable fluid having a relatively low auto-ignition temperature, for example as low as about 450° F., can come in contact with the insulation and ignite at the heated surface of the conduit.

It has been recognized through this invention that the relatively heavy and cumbersome insulation to inhibit heat transfer through a conduit wall can be eliminated. In addition, the structure to avoid such heat transfer or heat emission can be provided during manufacture of the conduit and before its assembly in an engine. The term "emissivity" is used herein in accordance with accepted, well-known heat transfer theory in which emissivity is the ratio of emission of a surface to emission of a black body.

According to a form of the present invention, provision on a conduit wall outer surface of a low emissivity coating of a selected combination of emissivity and thickness can result, through inhibiting thermal emission from a wall surface, in reduction of the temperature of another surface to below a selected temperature. For example, such selected temperature has been the auto-ignition temperature of a flammable fluid potentially contacting such surface, for example at about 700° F. for a typical flammable hydraulic fluid. To accomplish such emission control, the coating has a coating emissivity of less than 0.2, preferably in the range of about 0.05–0.1, in combination with a thickness of no greater than 5000 angstroms, preferably in the range of about 1000–2000 angstroms. During evaluation of the present invention, it has been recognized that a coating emissivity of less than 0.2 can be achieved with a metal coating based on at least one noble metal such as Pt or Au or their combinations with a thickness in the range of about 1000–2000 angstroms. Because such coatings are costly, it is desirable to avoid their thickness being greater than is effective for providing the selected coating emissivity. Therefore, in one form according to the present invention, the low emissivity coating thickness is sufficient to provide a selected coating emissivity of less than 0.2, and for practical purposes no greater than 5000 angstroms. For gas turbine engine applications, it is preferred that the coating be stable at a temperature of at least about 800° F. Current, low emissivity coatings capable of meeting such requirements have been reported, for example coatings based on at least one noble metal, typically Pt or Au or their combination.

Forms of the present invention will be described in connection with an aircraft gas turbine engine anti-ice conduit in the shape of generally circular cross section tubing. The total extent of such anti-ice tubing or conduit, from heat source to anti-ice heat application location, generally is segmented, joined at flanges and shaped appropriately with bends to pass around other components. One embodiment of the fluid conduit of the present invention especially for aircraft gas turbine engine use is shown generally as radially spaced-apart double wall conduit 10 in the diagrammatic sectional view of FIG. 1. Conduit 10 comprises a first member shown generally at 12 as a circular cross section tube disposed co-axially, radially within, second member shown generally at 14 as another circular cross section tube. First member 12 has an outside diameter 15. Such double wall structure provides added insurance for containment of fluid within first member 12 in the event of a rupture of first member 12. In addition, such structure enables provision, in accordance with the present invention, of the external surface temperature of conduit 10 to be below a selected auto-ignition temperature of a flammable fluid used in apparatus in the vicinity of the conduit.

Figure 2:
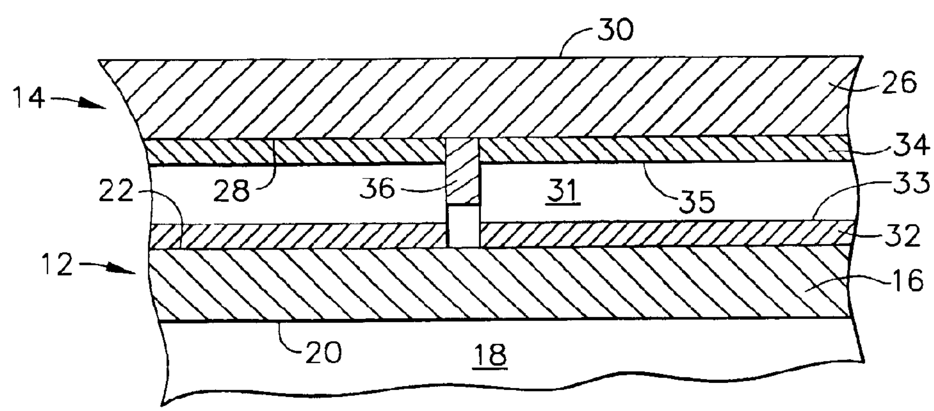
FIG. 2 is an enlarged, diagrammatic, fragmentary sectional view axially along the conduit of FIG. 1.

First member 12 comprises a metal first conduit wall 16 enclosing a hollow interior 18 for the flow of fluid axially therein. First wall 16 includes a first wall inner surface 20 and a first wall outer surface 22. Second member 14, disposed coaxially radially spaced-apart about first member 12 includes a metal second wall 26 having a second wall inner surface 28 and a second wall outer surface 30. Such disposition of the first and second members defines gap 31 therebetween. Typical of current practice, relatively long co-axial double wall conduit members or segments have been maintained spaced apart one from another by thin, ring-like, pronged spacers, one of which is shown in FIG. 2. Such spacers are disposed between the members in gap 31 periodically, axially along the conduit length. However, co-axial members in relatively short conduit segments can be maintained spaced apart through joining at member ends, such as at flanges, without the use of spacers. For relatively high temperature applications in a turbine engine in which the fluid in hollow interior 18 is at a relatively high temperature, for example in the range of about 800–1200° F. as described above, the metal of first and second walls 16 and 26 typically is made of a high temperature alloy based on at least one of the elements Fe, Co and Ni.

According to the embodiment of the present invention in FIG. 1, outer surface 22 of first wall 16 and inner surface 28 of second wall 26 each includes, respectively, a thin, single layer low emissivity first coating 32 and second coating 34 opposed to and facing one another across gap 31. In order to retain heat within hollow interior 18 effectively for typical aircraft gas turbine engine applications by inhibiting the emission of heat from outer surface 22 of first wall 16, across gap 31, and through second wall 26 to second wall outer surface 30, it was recognized that single layer coatings 32 and 34 have a particular combination of properties. These include a coating low emissivity of less than 0.2 achieved at a thickness in the range of about 1000–2000 angstroms. It has been recognized that a coating emissivity of 0.2 or above can allow a detrimental amount of heat to traverse the structure of conduit 10 and be emitted from second wall outer surface 30, heating outer surface 30 to an undesirable level. With a typical, selected low emissivity coating, for example an available coating based on a noble metal such as Pt and/or Au, it was recognized that a coating thickness in the range of about 1000–2000 angstroms was sufficient to contain the heat within conduit 10. Although a greater coating thickness can be applied, for example up to about 5000 angstroms, such coating can be more costly and not required to achieve the coating emissivity of no greater than 0.2. Because heat from the fluid within hollow interior 18 is contained in wall 16 by low emissivity first coating 32, wall 16 can operate at a temperature higher than it would with known insulation, generally reaching an equilibrium temperature with that of the fluid within hollow interior 18. As a result, a conduit system in accordance with the present invention transferring heat in a fluid from one point to another can operate at a higher efficiency than a conduit system with known thermal insulation about a conduit outer wall.

FIG. 2 is an enlarged, fragmentary, diagrammatic sectional view axially along conduit 10 of FIG. 1. In one type of relatively long assembly in accordance with a method form of the present invention, a plurality of spacers, one of which is shown at 36, is disposed in gap 31 between surfaces 22 and 28 during manufacture of the double wall structure shown and prior to application of first and second coatings 32 and 34. Other manufacturing methods for a relatively long expanse of conduit can dispose spacers 36 during assembly after coatings 32 and 34 are applied respectively to walls 22 and 28. Accordingly, to reduce potential heat transfer through spacers 36 when used, such spacers are of thin metal or of a material that resists thermal conduction, for example a material based on a non-metal or ceramic.

During evaluation of the present invention, in one specific example of the embodiment of FIGS. 1 and 2 in an aircraft gas turbine engine, anti-ice air within hollow interior 18 was at a temperature of about 1100° F. In addition, flammable hydraulic fluid used in apparatus in the vicinity of conduit 10, and which potentially could contact second wall outer surface 30 in the event of a hydraulic system leak, had an auto-ignition temperature of about 700° F. Therefore, because it was required in the operational conditions of this example to reduce the temperature of outer surface 30 to below such auto-ignition temperature, it was found that the combination of low emissivity coatings in juxtaposition across the gap between members in the embodiment of FIGS. 1 and 2 fulfilled such requirement.

In that example, walls 16 and 26 respectively of first and second members 12 and 14 were made of a high temperature Ni base alloy commercially available as Inconel 625 alloy with an emissivity in the new or unused condition of about 0.4. After operation in a gas turbine engine, the emissivity of the surface of such alloy can increase to 0.8 or more, for example as a result of surface oxidation. First member 12 had a selected outside diameter 15 of about 1" and second member 14, disposed spaced apart about first member 12, had a selected inside diameter of about 1.4". During evaluation of the present invention, it was recognized that in an embodiment as in FIGS. 1 and 2 comprising the radially spaced apart double wall conduit, reflection was to be avoided or minimized between portions of inner surface 28 of wall 26. Gap 31 with a radial length 37 of no greater than about 30% of the outside diameter 15 of first member 12 was found adequate to inhibit thermal reflection between portions of inner surface 28 of wall 26. In this example, radial length 37 of gap 31 between outer surface 22 of first member 12 and inner surface 28 of second member 14 was selected to be about 0.2", as small as practical based on available commercial tubing to enable assembly of the conduit. Such length 37 was less than 30% of outside diameter 15 of first member 12 and within a preferred range of about 0.1–0.25".

During one evaluation, first and second coatings 32 and 34 were deposited by a reactive vaporization as single layer coatings respectively on surfaces 22 and 28 from a coating material based on platinum acetylacetonate to a thickness of about 1000 angstroms, in the preferred range of about 1000–2000 angstroms. Coatings 32 and 34 had an emissivity of about 0.05, in preferred the range of about 0.05–0.1. As used herein, "reactive vaporization" means a coating deposition method comprising providing a medium, for example a vapor or a liquid, carrying one or more coating elements, for example Pt, Au, or their combinations. The surface to be coated is contacted by the medium to deposit thereon a coating precursor. The coating precursor is treated, for example by heating under appropriate temperature and atmosphere conditions, to bond the coating element in the coating precursor to the surface to be coated. One example of reactive vaporization is the commercially available and used chemical vapor deposition method. Another example contacts a surface to be coated with a liquid carrying the coating element to provide a coating precursor film on the surface. Then the film is heated to eliminate liquid and to bond the coating element to the surface.

In this evaluation, with the fluid temperature within hollow interior at about 1100° F., it was found that the combination of juxtaposed, single layer coatings 32 and 34 spaced-apart across gap 31 both were required with gap 31 to reduce the temperature of outer surface 30 to below the auto-ignition temperature of about 700° F. In such combination, coating 32 on outer surface 22 of first member wall 16 retained heat within wall 16. Any thermal energy emitted from coating surface 33 of coating 32 passed across gap 31 and was reflected by outer surface 35 of second coating 34 toward first member 12. In effect, second coating 34 provided gap 31 with a low emissivity coating. Thus thermal energy was inhibited from penetrating wall 26 of second member 14 in an amount sufficient to increase in the temperature of outer surface 30 of second wall 26 to an undesirable amount, in this example 700° F.

According to a method form of the present invention, a pair of uncoated first and second members 12 and 14 of the above specific example were provided for assembly according to current practice co-axially into a conduit segment preform. A plurality of appropriately sized spacers 36 were disposed about outer surface 22 of first member 12 prior to assembly to maintain gap 31 between the members. Then smaller diameter first member 12 was secured, for example by brazing within and spaced-apart from larger diameter second member 14 to define gap 31 therebetween. Such assembly represented a conduit segment of a fluid conduit of greater length defined by a plurality of shaped segments joined at juxtaposed flanges. After such assembly, the preform was shaped into a conduit segment with at least one and typically with several bends, some at relatively sharp angles, appropriately for its location in the final conduit according to a predetermined design to pass about other engine or aircraft components.

After shaping, the conduit segment was cleaned with solvent to remove surface contaminants. Then a liquid carrying predominantly platinum acetylacetone as the coating element was disposed within gap 31 to contact and deposit a coating precursor film on surfaces 22 and 28. The conduit segment then was placed within a commercial oven and heated to remove liquid from the film and to bond the coating element Pt to surfaces 22 and 28. This provided Pt-base single layer low emissivity coatings 32 and 34 concurrently on surfaces 22 and 28 to a thickness of about 1000 angstroms.

Figure 3:
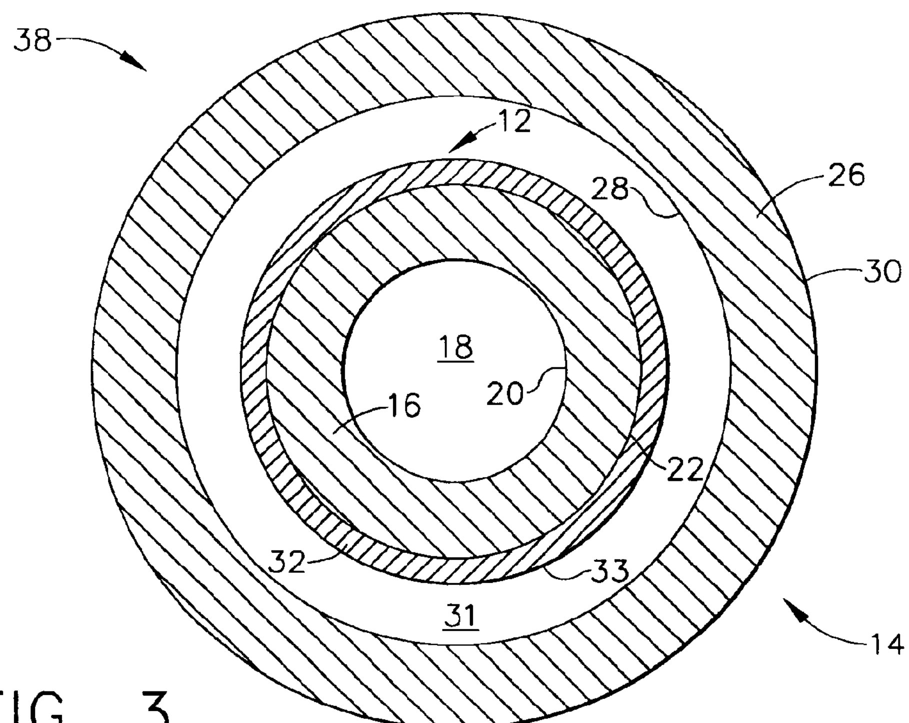
FIG. 3 is diagrammatic sectional view of another embodiment, as in FIG. 1, in which the conduit includes a single low emissivity coating on an outer surface of the wall of an inner member.

Another embodiment of the present invention, in the form of the spaced-apart double wall conduit described in connection with FIGS. 1 and 2 is shown generally at 38 in the diagrammatic sectional view of FIG. 3. That embodiment represents one in which the temperature of fluid in hollow interior 18 and/or the desired temperature of wall outer surface 30 is sufficiently low to enable thermal control in accordance with the present invention through use of a single low emissivity coating 32 on surface 22 of first member 12.

Figure 4:
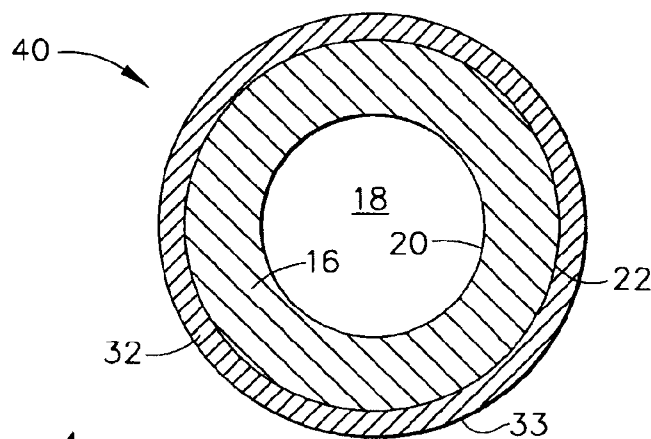
FIG. 4 is still another embodiment comprising a single wall conduit structure including a thin, low emissivity coating on an outer surface of the wall.

Another embodiment of the present invention is shown in the diagrammatic sectional view of FIG. 4. Such a conduit shown generally at 40 includes a single wall 16, as in first member 12 in FIGS. 1–3, having a single layer low emissivity coating 32 on wall outer surface 22. Such an embodiment can be used in applications to enhance the efficiency of systems in which elevated temperature fluids flow between locations. As was mentioned above, provision of the thin, single layer low emissivity coating according to the present invention on a conduit outer wall surface inhibits emission of thermal energy from such surface and maintains heat within the fluid. Although, the conduit wall operates at a higher than normal temperature, requiring selection of a metallic wall material that can withstand such elevated temperature, the efficiency of the system is increased through use of the single layer low emissivity coating according to the present invention.

The present invention has been described in connection with specific embodiments, structures, materials and methods. However, it will be understood that they are intended to be typical and representative of rather than in any way limiting on the scope of the present invention. Those skilled in the various arts involved, for example relating to turbine engines, to metallic and non-metallic materials, to metallic coatings, to heat transfer mechanisms and theory, and their combinations, will understand that the invention is capable of variations and modifications without departing from the scope of the appended claims.

What is claimed is:

1. A multiple spaced-apart wall fluid conduit enclosing a hollow interior for the flow of a fluid therein, comprising:

a metal first conduit wall having a radially inner first surface enclosing the hollow interior and a radially outer second surface; and, a metal second conduit wall spaced apart radially outwardly from the first conduit wall and having a radially inner third surface spaced apart radially in juxtaposition with the outer second surface of the first wall to define a gap therebetween, wherein:

the first conduit wall includes on the outer second surface a single layer first low emissivity metal coating, and the second conduit wall includes on the inner third surface a single layer second low emissivity metal coating;

the first and second low emissivity coatings each having a coating emissivity of less than 0.2 and a coating thickness at least sufficient to provide the coating emissivity.

2. The fluid conduit of claim 1 in which the coating thickness is no greater than 5000 angstroms.

3. The fluid conduit of claim 2 in which each of the first and second coatings has:

a coating emissivity in the range of about 0.05–0.1; and, a coating thickness in the range of about 1000–2000 angstroms.

4. The fluid conduit of claim 1 in which:

the first conduit wall defines an inner first member of substantially circular cross section and having a first member outside diameter;

the second conduit wall defines an outer second member of substantially circular cross section disposed radially outwardly about the first member and spaced apart from the first member across the gap;

the gap having a radial gap length of no greater than about 30% of the first member outside diameter.

5. The fluid conduit of claim 4 in which the gap has a radial length of less than 0.3 inches.

6. The fluid conduit of claim 5 in which the gap has a radial length in the range of about 0.1–0.25 inches.

7. The fluid conduit of claim 4 in the form of an aircraft gas turbine engine anti-ice conduit segment, in which:

the first conduit wall and the second conduit wall each has an emissivity of at least about 0.4 prior to use and is made of a metal alloy based on at least one element selected from the group consisting of Fe, Co, and Ni and capable of withstanding the flow of the fluid at a temperature of at least about 800° F.; and, the first and second low emissivity coatings each is based on an element selected from the group consisting of Pt, Au, and their combinations.

8. The fluid conduit of claim 7 in which:

the coating emissivity of each of the first and second coatings is in the range of about 0.05–0.1;

the gap radial length is in the range of about 0.1–0.25 inches; and, the thickness of each of the first and second coatings is in the range of about 1000–2000 angstroms.

9. A multiple spaced-apart wall fluid conduit enclosing a hollow interior for the flow of fluid therein, comprising:

a metal first conduit wall having a radially inner first surface enclosing the hollow interior and a radially outer second surface; and, a metal second conduit wall conduit wall spaced apart radially outwardly from the first conduit wall and having a radially inner third surface spaced apart radially in juxtaposition with the outer second surface of the first wall to define a gap therebetween, wherein:

the first conduit wall includes on the outer second surface a single layer low emissivity metal coating;

the low emissivity coating having a coating emissivity of less than 0.2 and a coating thickness at least sufficient to provide the coating emissivity.

10. The fluid conduit of claim 9 in which the coating thickness is no greater than 5000 angstroms.

11. The fluid conduit of claim 10 in which the low emissivity coating has:

a coating emissivity in the range of about 0.05–0.1; and, a coating thickness in the range of about 1000–2000 angstroms.

12. The fluid conduit of claim 9 in which:

the first conduit wall defines an inner first member of substantially circular cross section and having a first member outside diameter;

the second conduit wall defines an outer second member of substantially circular cross section disposed radially outwardly about the first member and spaced apart from the first member across the gap;

the gap having a radial gap length of no greater than about 30% of the first member outside diameter.

13. The fluid conduit of claim 12 in which the gap has a radial length of less than 0.3 inches.

14. The fluid conduit of claim 13 in which the gap has a radial length in the range of about 0.1–0.25 inches.

15. The fluid conduit of claim 9 in which:

the first and second conduit walls each is made of metal alloy based on at least one element selected from the group consisting of Fe, Co, and Ni; and, the low emissivity coating is based on an element selected from the group consisting of Pt, Au, and their combinations.

16. The fluid conduit of claim 15 in which:

the coating emissivity is in the range of about 0.05–0.1;

the gap radial length is in the range of about 0.1–0.25 inches; and, the coating thickness is in the range of about 1000–2000 angstroms.

17. A method for making a multiple spaced-apart wall fluid conduit enclosing a hollow interior for the flow of fluid therein, comprising:

providing a first conduit member having a metal first wall including a radially inner first surface defining the hollow interior and a radially outer second surface of a first radial diameter, and a second conduit member having a metal second wall including a radially inner third surface of a second radial diameter greater than the first radial diameter;

assembling the first conduit member co-axially with and radially within the second conduit member to provide an assembly with the outer first surface of the first member maintained radially spaced-apart from the inner third surface of the second member to define a gap therebetween; and then, depositing a low emissivity coating concurrently on each of the radially outer first surface of the first member and the radially inner third surface of the second member from within the gap.

18. The method of claim 17 in which, after providing the assembly of the first and second conduit members and before depositing the coating, the assembly is shaped with bends for assembly about associated apparatus.

19. The method of claim 17 in which the low emissivity coating is deposited by reactive vaporization to a thickness of no greater than 5000 angstroms.

20. The method of claim 19 in which the coating is deposited from a metal compound based on an element selected from the group consisting of Pt, Au, and their combinations.

* * * * *